(12) United States Patent
Doehring et al.

(10) Patent No.: US 10,968,946 B2
(45) Date of Patent: Apr. 6, 2021

(54) TILTING-PAD BEARING

(71) Applicant: Robert Bosch GmbH, Stuttgart (DE)

(72) Inventors: Jochen Doehring, Stuttgart-Stammheim (DE); Tim Maier, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/329,015

(22) PCT Filed: Aug. 10, 2017

(86) PCT No.: PCT/EP2017/070264
§ 371 (c)(1),
(2) Date: Feb. 27, 2019

(87) PCT Pub. No.: WO2018/041578
PCT Pub. Date: Mar. 8, 2018

(65) Prior Publication Data
US 2020/0182290 A1    Jun. 11, 2020

(30) Foreign Application Priority Data

Aug. 31, 2016  (DE) .................. 10 2016 216 395.7

(51) Int. Cl.
| | |
|---|---|
| *F16C 17/03* | (2006.01) |
| *F16C 23/02* | (2006.01) |
| *F16C 25/02* | (2006.01) |
| *F16C 27/02* | (2006.01) |
| *F16C 35/02* | (2006.01) |

(52) U.S. Cl.
CPC ............ *F16C 17/035* (2013.01); *F16C 17/03* (2013.01); *F16C 23/02* (2013.01); *F16C 25/02* (2013.01); *F16C 27/02* (2013.01); *F16C 35/02* (2013.01)

(58) Field of Classification Search
CPC ........ F16C 17/03; F16C 17/035; F16C 17/06; F16C 17/065; F16C 32/0666; F16C 23/04; F16C 25/02; F16C 25/04; F16C 27/02; F16C 35/02
See application file for complete search history.

(56) References Cited

U.S. PATENT DOCUMENTS

| | | | |
|---|---|---|---|
| 3,572,856 A * | 3/1971 | McHugh .................. | F16C 17/03 384/309 |
| 5,603,574 A * | 2/1997 | Ide ......................... | F01D 25/164 384/117 |
| 2008/0095482 A1* | 4/2008 | Swann ..................... | F16C 17/03 384/192 |

(Continued)

FOREIGN PATENT DOCUMENTS

| | | |
|---|---|---|
| CN | 103534905 A | 1/2014 |
| CN | 105339688 A | 2/2016 |

(Continued)

OTHER PUBLICATIONS

International Search Report for Application No. PCT/EP2017/070264 dated Nov. 7, 2017 (English Translation, 2 pages).

*Primary Examiner* — Alan B Waits
(74) *Attorney, Agent, or Firm* — Michael Best & Friedrich LLP

(57) ABSTRACT

The invention relates to a tilting-pad bearing (7), comprising: a sleeve (15); a plurality of tilting pads (9); and a frame (8), in which the tilting pads (9) are held.

21 Claims, 2 Drawing Sheets

(56) References Cited

U.S. PATENT DOCUMENTS

| | | | |
|---|---|---|---|
| 2010/0098564 A1* | 4/2010 | Parmeter | F16C 17/03 417/423.3 |
| 2012/0181734 A1* | 7/2012 | Zeidan | F16C 17/03 267/140.11 |
| 2014/0212283 A1* | 7/2014 | Kirk | F16C 17/03 415/208.1 |
| 2015/0104124 A1 | 4/2015 | Delgado Marquez et al. | |
| 2015/0139573 A1* | 5/2015 | Klusacek | F04D 29/057 384/114 |
| 2016/0169281 A1 | 6/2016 | Ertas et al. | |
| 2017/0350444 A1* | 12/2017 | Vogt | F16C 23/04 |
| 2019/0219097 A1* | 7/2019 | Doehring | F16F 1/3737 |

FOREIGN PATENT DOCUMENTS

| | | | |
|---|---|---|---|
| CN | 205207428 U | 5/2016 | |
| CN | 105805155 A | 7/2016 | |
| DE | 1915310 | 8/1970 | |
| DE | 102010049493 | 5/2012 | |
| EP | 3009700 A1 | 4/2016 | |
| JP | S5244356 A | 4/1977 | |
| JP | S5244365 A | 4/1977 | |
| JP | 6366617 | 5/1988 | |
| JP | H0276920 A | 3/1990 | |
| JP | H0727132 A | 1/1995 | |
| JP | H07151139 A | 6/1995 | |

\* cited by examiner

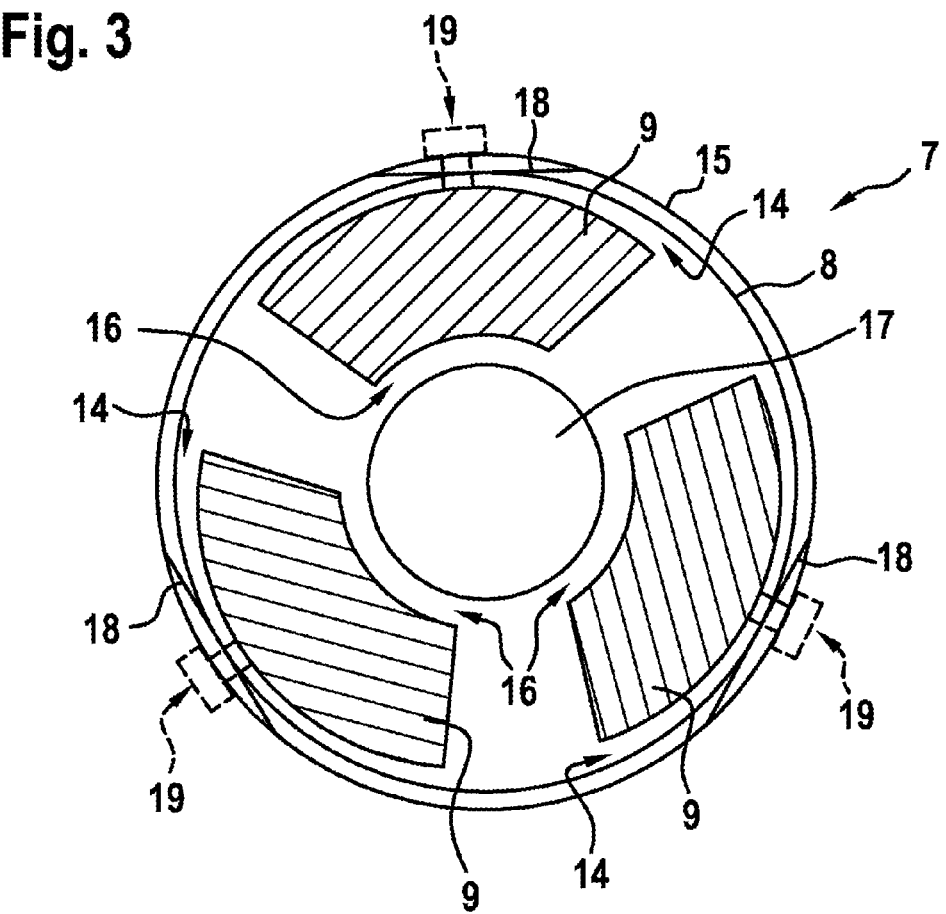

TILTING-PAD BEARING

BACKGROUND OF THE INVENTION

The invention relates to a tilting-pad bearing for supporting a shaft.

Tilting-pad bearings are of the air bearing type.

DE 10 2010 049 493 A1 discloses an annular support part, which comprises apertures in which bearing elements are arranged. The bearing elements take the form of tilting pads. Arranged in the aperture of the support part here is a retaining element, which has a mushroom-shaped configuration, so that one or more lugs, which form undercuts, are arranged in the area of the retaining element. These undercuts interact with an aperture which is introduced into the bearing element and which is likewise formed in a manner corresponding to the undercuts of the retaining element, so that in the assembled state suitable parts of the bearing element grip with clearance behind the undercuts. When inserted into the aperture, the bearing element is latched into the aperture of the support part and can thus be secured to prevent it falling out.

SUMMARY OF THE INVENTION

The invention discloses a tilting-pad bearing.

Accordingly, tilting-pad bearing is provided, comprising:
a sleeve,
tilting pads, and
a frame, in which the tilting pads are received.

The frame allows the tilting pads to be pre-assembled and held in a pre-assembly position by the frame. This facilitates both production and assembly. In addition, it serves to prevent the tilting pads being accidently mixed up with a different set of tilting pads. Furthermore, the tilting pads can be arranged and held in the frame in a predefined position relative to one another.

In one embodiment according to the invention a spring element is provided between the inside of the sleeve and each assigned tilting pad. The spring element here may be connected to the frame or integrated therein. This has the advantage that the spring element integrated into the frame has a defined position in relation to the frame. Equally, the spring element may be arranged as a separate component or one independent of the frame between the inside of the sleeve and the frame. This has the advantage of affording a greater design freedom for the spring element.

In a further embodiment of the invention the frame comprises at least one mounting portion for holding the assigned tilting pad in the frame. Moreover, the respective tilting pad can be held in the frame by at least the one mounting portion in such a way that the tilting pad has some play in a radial direction and optionally also in a circumferential direction, in order to allow the tilting pad to tilt in a circumferential direction. The tilting pad play in a radial direction allows adjustment of a gap between the sleeve and the tilting pad and in conjunction with this a gap between the tilting pad and the shaft to be supported in the tilting-pad bearing.

According to a further embodiment of the invention the frame comprises at least two mounting portions for holding the assigned tilting pad. At least the two mounting portions are provided on opposite sides of the tilting pad and grip laterally around the tilting pad. The respective tilting pad is held in the frame by at least the two mounting portions in such a way that the tilting pad has some play in a radial direction and optionally also in a circumferential direction, in order to allow the tilting pad to tilt in a circumferential direction.

In another embodiment of the invention the tilting pad comprises a recess, for example a step, behind which the respective mounting portion can grip or hook. The recess, such as the step on the side of the tilting pad, for example, has the advantage that the mounting portion does not protrude with its outer end beyond the inside of the tilting pad and in so doing extend into the gap between the inside of the tilting pad and the shaft.

In a further embodiment of the invention the tilting pad comprises a depression, for example a grooved depression, in which at least a portion of the assigned mounting portion can be received and guided in such a way that the tilting pad is either immovable or movable only within a predefined amount of play in an axial direction of the tilting-pad bearing. It is thereby additionally possible to prevent the tilting pad accidentally falling out of the frame in an axial direction.

In addition, in one embodiment of the invention the tilting pad, on at least one side, comprises at least one slot for the assigned mounting portion, for inserting the outer end of the mounting portion into the slot. This likewise serves for reliable retention of the tilting pad. In addition, the slot may be formed in such a way that it allows some radial play of the tilting pad and optionally also some play of the tilting pad in a circumferential direction.

According to one embodiment of the invention the tilting-pad bearing comprises an adjusting device for adjusting the initial spring tension of the respective spring element and thereby adjusting a gap between the sleeve and the tilting pad and between the tilting pad and the shaft to be supported. The adjusting device for adjusting the initial spring tension may be connected or coupled both to the assigned tilting pad or to the assigned spring element.

In one embodiment of the invention the frame comprises two annular portions, which are connected to one another by connecting portions. Here the respective connecting portion is situated opposite an assigned tilting pad. The connecting portion can thereby be simultaneously provided with at least the one mounting portion and the assigned spring element. In particular, such a frame with the respective mounting portion, spring element and/or connecting portion can very easily be stamped, sawn or cut out, and the mounting portion and/or the spring element then, if necessary, additionally shaped. For example, the mounting portion may be accordingly bent into the required shape for receiving and holding the assigned tilting pad.

In a further embodiment of the invention the mounting portion and/or the spring element are formed on the assigned connecting portion. The mounting portion and/or the spring element may be integrally formed with the connecting portion, for example, or may also be affixed to the latter as a separate component.

According to one embodiment of the invention the spring element may be formed in a circumferential direction as an elongated web on each of the two sides of the connecting portion. In this way the frame can be designed and used not only for mounting the tilting pads but also at the same time for generating the initial spring tension of the spring element, In a further embodiment of the invention the frame may be produced from sheet metal, plastic and/or a fiber composite. In the case of a sheet metal, for example, the connecting portion, the mounting portion and/or the spring element can be stamped, cut or milled out of the frame sheet metal and, if necessary, shaped further. The corresponding frame sheet metal can then be joined to form a closed ring, for example, by welding, soldering, riveting, adhesive bonding etc.

In a further embodiment of the invention the two annular portions of the frame can be connected to one another by means of at least one additional connecting web. This serves to reinforce the frame in addition to the connecting portions.

BRIEF DESCRIPTION OF THE DRAWINGS

Further features and advantages of the present invention are explained below, referring to the figures, of which:

FIG. 3 shows a schematic front view of the tilting-pad bearing according to the invention in FIGS. 1 and 2, showing the cushioning foils and the upper foils of the tilting-pad bearing.

DETAILED DESCRIPTION

The tilting-pad bearing according to the invention afford a reduction in the manufacturing complexity of the tilting-pad bearing. In addition, assembly can be simplified through an alternative assembly concept and it is furthermore possible to improve the scope for positioning of the shaft to be supported by the tilting-pad bearing, as is explained in more detail below with reference to FIGS. 1, 2 and 3.

Figure 1:
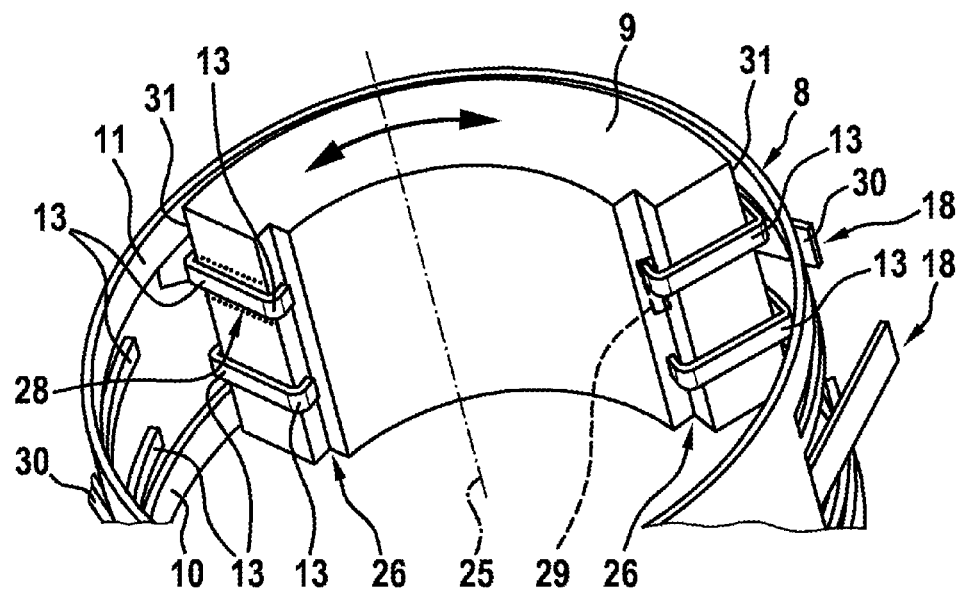
FIG. 1 shows a perspective view of a detail of a tilting-pad bearing according to one embodiment of the invention.
Figure 2:
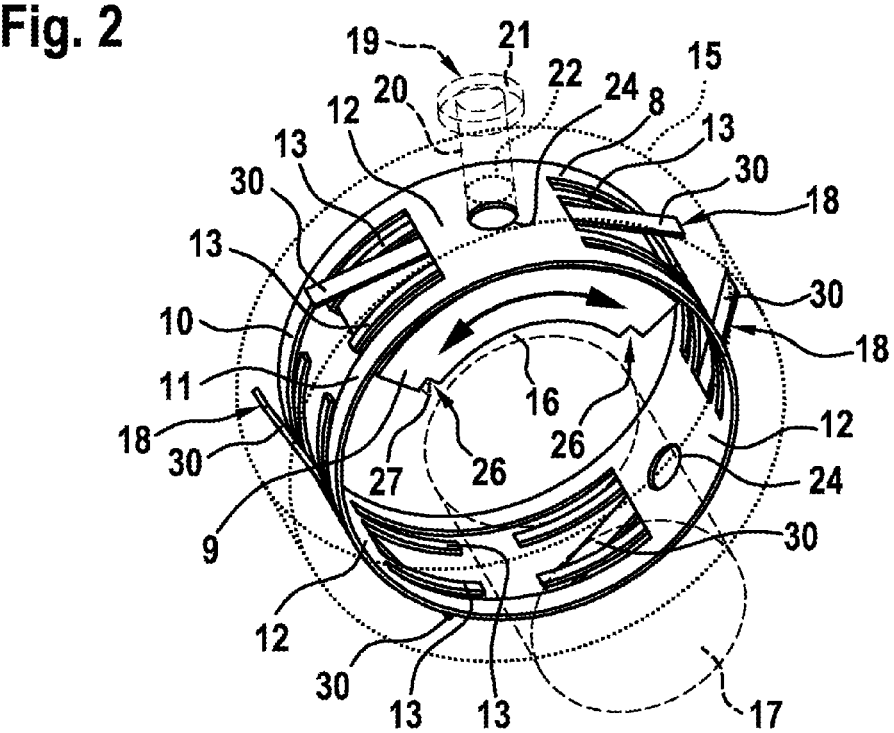
FIG. 2 shows a further perspective view of the tilting-pad bearing according to the invention in FIG. 1, in which a shaft is accommodated in the tilting-pad bearing.

FIGS. 1 and 2 show one embodiment of the tilting-pad bearing 7 according to the invention. Here FIG. 1 shows a detail of the tilting-pad bearing 7 according to the invention in a perspective view and FIG. 2 shows a further perspective view of the tilting-pad bearing 7 according to FIG. 1.

A frame 8 is used in the tilting-pad bearing 7 according to the invention.

The frame 8 here is designed to hold the tilting pads 9 of the tilting-pad bearing 7, in particular in a predetermined or defined position. The frame 8 here is of annular formation and in the exemplary embodiment shown in FIGS. 1 and 2 comprises two annular portions 10, 11, for example, which are each connected to one another by multiple connecting portions 12. The respective connecting portion 12 is situated opposite the assigned tilting pad 9 to be received in the frame 8.

For mounting each tilting pad 9, the frame 8 respectively comprises at least one mounting portion 13, which is described in more detail below, referring to an exemplary embodiment. At least the one mounting portion 13 for a tilting pad 9 is here connected to the connecting portion 12 of the frame 8, for example. In FIGS. 1 and 2 only the mounting portions 13 for holding one of the tilting pads 9 is represented in full. For reasons of clarity, the other mounting portions 13 are only partially represented in FIGS. 1 and 2.

In FIGS. 1 and 2 a tilting pad 9 is shown accommodated in the frame 8. Here, in the exemplary embodiment in FIGS. 1 and 2, the tilting pad 9 is held by two mounting portions 13, for example, on each of two circumferentially opposite sides of the tilting pad 9. The tilting pad 9 is held in a pre-assembly position by the frame. The tilting pad 9 may be held in the pre-assembly position by the frame 8 and its respective mounting portion 13.

The respective tilting pad 9 in the exemplary embodiments shown in FIGS. 1-3 is of curved formation and has a curved outer circumference and a curved inner circumference. The curved outer circumference here is more heavily curved than the circular frame in its initial position, so that the outer edges 31 of the tilting pad 9 do not bear on the inner circumference of the frame 8, but are separated by a distance from this, as can best be seen in FIG. 1. As a result, the mounting portions 13 for holding the tilting pad 9 are not flush with the two annular portions 10, 11 and with the assigned connecting portion 12 but instead run inclined inwards. This has the advantage that an additional spring effect can be provided by the mounting portions 13. In principle, the curved outer circumference of the respective tilting pad 9 may also be bent or arched, however, in such a way that it bears on the inner circumference of the frame 8. In this case the outer radius of the tilting pads, for example, may be equal to the radius or more precisely the inner radius of the frame 8.

In addition, a spring element 18 is provided between the sleeve 15 and the respective tilting pad 9. In the exemplary embodiment, as shown in FIGS. 1 and 2, the spring element 18 is integrated into the frame 8.

In principle it is also possible, however, to provide the spring element 18 as a separate component (not shown) between the inside of the sleeve 15 and the outside of the frame 8 in the area of the respective tilting pad 9.

In one exemplary embodiment, as is indicated by a dashed line in FIG. 2, the respective tilting pad 9 of the tilting-pad bearing 7 may be provided with an additional adjusting device 19 for adjusting a gap 14 between the outside of the respective tilting pad 9 and the inside of the sleeve 15, and/or a gap between the outside of the assigned spring element 18 and the inside of the sleeve 15. The adjusting device 19 may be suitably coupled to the spring element 18 or the tilting pad 9 for adjusting the respective gap. The adjusting device 19 is represented greatly simplified and purely schematically by a dashed line in FIG. 2. In the example shown in FIG. 2 the adjusting device 19 comprises a pin element 20 and a nut 21. The pin element 20 here is coupled to the spring element 18. For example, the pin element 20 is designed in such a way that the spring element 18 can be threaded onto the pin element 20 and cannot accidentally slide off the pin element 20, thanks to a step (not shown) on the pin element 20. The pin element 20 is fed through a passage in the sleeve 15 and comprises an external thread portion, along which the nut 21 on the outside of the sleeve 15 can be screwed in the direction of the spring element 18 or the tilting pad 9 or counter to this, in order to adjust the gap between the outside of the spring element 18 and the inside of the sleeve 15, and an associated initial spring tension of the spring element 18. The invention is not limited to this special embodiment of the adjusting device, however. Any adjusting device may be provided that is suitable for adjusting the gap between the outside of the tilting pad and the inside of the sleeve, or the gap between the outside of the spring element and the inside of the sleeve and an associated initial spring tension of the assigned spring element. If the adjusting device is coupled to the tilting pad, the passage for feeding the pin element through is preferably designed in such a way that the pin element and the tilting pad connected thereto can tilt, that is to say can tilt in a circumferential direction. The spring element and the adjusting device may, in principle, also be omitted, depending on the function and intended purpose.

In an alternative embodiment of the adjusting device (not shown) the adjusting device may equally comprise a pin portion having an external thread, which as a separate component is connected to the tilting pad 9 and at the same time is rotatable about its longitudinal axis. In a preferred embodiment the pin portion here is connected to the tilting pad 9 in such a way that the pin portion is rotatable about its longitudinal axis and in addition allows the tilting pad 9 to tilt, in particular in a circumferential direction or about the longitudinal axis 25 of the tilting-pad bearing 7. The pin portion here is received in a threaded hole of the sleeve 15, which preferably runs in a radial direction of the sleeve 15 and leads through the aperture in the assigned connecting portion 12 of the frame 8. By turning the pin portion about its axis, the pin portion and the tilting pad connected to it can be moved up and down, thereby adjusting the respective gap 14, 16 between the sleeve 15 and the tilting pad 9 and between the tilting pad 9 and the shaft 17, together with the initial spring tension of the spring element.

In another embodiment according to the invention (not shown) the pin element, instead of being connected to the tilting pad 9, is connected to the spring element 18 and is detachably or permanently affixed to this. In this embodiment the gap 14 between the sleeve 15 and the tilting pad 9 and the gap 16 between the tilting pad 9 and the shaft 17 can be adjusted, and in particular indirectly adjusted, by the adjusting device connected to the spring element 19. The pin element here, as previously described, may be in threaded engagement, through its external thread, with the aforementioned nut and may be fed through the passage in the sleeve 15, or instead of this may be in threaded engagement with the threaded hole in the sleeve 15, as likewise previously described as an alternative. The pin element here need not allow tilting of the spring element 18 in a circumferential direction, as previously in the case of the tilting pad 9, but may possibly allow this depending on the function and intended purpose.

By adjusting the distance between the inside of the sleeve 15 and the outside of the spring element 18 and accordingly the initial tension of the spring element 18, it is possible to adjust the gap height between the inside of sleeve 15 and the outside of the tilting pad 9 and the gap height between the inside of the tilting pad 9 and the outside of the shaft 17, and vice-versa.

The invention, however, is not limited to the exemplary embodiments of the adjusting device 19 cited for direct or indirect adjustment of the gap 14 between the inside of the sleeve 15 and the outside of the tilting pad 9 and the gap 16 between the inside of the tilting pad 9 and the outside of the shaft 17, and the associated initial spring tension of the spring element 18. Any form of adjusting device 19 may be provided which is connected to the tilting pad 9 or the spring element 19 for directly or indirectly adjusting the respective gap 14, 16 and an associated initial spring tension of the spring element 18.

As is shown in FIGS. 1 and 2, the frame 8 takes the form of a ring, the ring in the exemplary embodiment in FIGS. 1 and 2, for example, comprising the two aforementioned closed annular portions 10, 11, which are connected to one another at least via the connecting portions 12. As previously described, the respective connecting portion 12 is situated opposite an assigned tilting pad 9. Depending on the size of the tilting-pad bearing 7, the frame 8, for additional reinforcement, may also comprise at least one additional connecting web (not shown), which connects the two annular portions 10, 11 together, in addition to the connecting portions 12.

For mounting the respective tilting pad 9, the frame 8, as previously described, comprises at least the one mounting portion 13, which is coupled to the tilting pad 9 in such a way that it holds and positions the tilting pad 9 in the frame 8.

The mounting portion 13 and the spring element 18 here in the exemplary embodiment in FIGS. 1 and 2 are integrated into the frame 8 and integrally formed with the latter. The mounting portion 13 and/or the spring element 18 may be integrally formed with the frame 8 or connected to the frame 8 as a separate component, as explained further below.

In the exemplary embodiment in FIGS. 1 and 2, for example, the respective mounting portion 13 is formed in such a way that it at least partially grips around the tilting pad 9 from one side or hooks on under the tilting pad 9. For this purpose, the tilting pad 9 may be provided with an additional recess 26, for example a step, as is shown in FIGS. 1 and 2, on which the mounting portion 13 hooks from below, or the tilting pad can be gripped by the mounting portion 13. As previously stated, in FIGS. 1 and 2 only the mounting portions 13 for holding the one tilting pad 9 shown are represented in full. For reasons of clarity, the other mounting portions 13 are only partially represented.

In the exemplary embodiment shown in FIGS. 1 and 2 the recess 26 takes the form of a step, which extends through from the front to the rear side of the tilting pad 9. This has the advantage that the mounting portion 13 does not protrude into the gap 16 between the inside of the tilting pad 9 and outside of the shaft 17 to be supported in the tilting-pad bearing 7. The recess 26 shown in FIGS. 1 and 2 in the form of a step, for example, may optionally also be provided with an undercut 27, as is indicated by a dotted line in FIG. 2, for the mounting portion 13 to hook under or latch on the tilting pad 9.

In addition or alternatively, a depression 28, for example a grooved depression, may be provided on the side of the tilting pad 9, as is indicated by a dashed line in FIG. 1 for one of the mounting portions 13, in which depression the respective mounting portion 13 can be inserted and laterally guided therein, so that the respective tilting pad 9 is not accidentally able to move in a longitudinal direction relative to the respective mounting portion 13, or is able to move only within a predefined play in a longitudinal direction. In addition, or as an alterative to the depression 28 and/or the recess 26 in the tilting pad 9, the tilting pad 9 may also comprise at least one lateral slot 29, into which the outer end of the assigned mounting portion 13 can be laterally inserted, as is indicated by a dashed line in FIG. 1. The slot 29 here may be formed in such a way that it allows some radial play and possibly some play in a circumferential direction of the tilting pad 9.

In the exemplary embodiment shown in FIGS. 1 and 2 two mounting portions 13 of the frame 18, for example, are provided on each of the two sides of the tilting pad 9 for hooking under, latching or clipping in. The mounting portions 13 here extend on both sides of the connecting portion 12 and are bent downwards or inwards from this, for example in a C-shape or depending on the width of the connecting portion 12 in an L-shape (not show), for receiving the assigned tilting pad 9.

The frame 8 here may be formed as a sheet-metal ring, for example, on which the mounting portions 13 and/or the spring elements 18 have been previously formed, for example by stamping, sawing and/or cutting out and optionally also shaped, for example by bending etc. The frame 8 with the mounting portions 13 and/or the spring elements 18 may equally well be produced from plastic and/or a fiber composite etc., or a combination of plastic, metal and/or a fiber composite.

As is shown in the exemplary embodiment in FIGS. 1 and 2, a respective spring element 18 is formed on the frame 8 for each of the tilting pads 9, for example. In the exemplary embodiment in FIGS. 1 and 2 the spring element 18 is integrally formed with the frame 8. It may equally well be affixed to this as a separate component, however, for example by riveting, welding, soldering, adhesive bonding and/or fusing etc. Similarly, the spring element 18 may also be inserted as a separate component (not shown) only between the inside of the sleeve 15 and the outside of the tilting pad 9. Here the spring element 18 may be provided with an additional aperture, for example, through which only a pin element, for example, or a pin portion of the assigned, optional adjusting device 19 is fed. Should the spring element 18 be integrated into the frame 8, the aperture in the spring element 18 may at the same time be the aperture 24 in the connecting portion 12, if the tilting-pad bearing provides the additional adjusting devices 19 for the tilting-pad bearing and its spring elements.

The spring element 18 is embodied, for example, in the form of two elongated webs 30 running in a circumferential direction of the frame 8. The webs 30 here in the exemplary embodiment in FIGS. 1 and 2 are arranged on the two opposite sides of the connecting portion 12 of the frame 8. The length of the webs 30 here is selected in such a way, for example, that the webs 30 are pretensioned when the frame 8 is in the fitted position in the sleeve 15. By adjusting the gap height between the inside of the sleeve 15 and the outside of the tilting pad 9, it is possible to adjust the initial tension of the assigned spring element 18, in this case the two webs 30 in the exemplary embodiment in FIGS. 1 and 2. The webs 30 may furthermore also be additionally shaped, or bent, depending on the function and intended purpose in the tilting-pad bearing 7. The invention here is not limited to the form of the spring element 18 having two elongated webs 30, as in FIGS. 1 and 2. The spring element 18 may take any form that is suited to use in a tilting-pad bearing 7 and in particular for initial tensioning of the assigned tilting pad 9.

FIG. 3 shows a greatly simplified, purely schematic front view, not to scale, of the tilting-pad bearing 7 according to the invention in FIGS. 1 and 2. The tilting-pad bearing 7 here comprises the three tilting pads 9, which are accommodated in the frame 8. The mounting portions of the frame 8 for the respective tilting pad 9 are not represented in FIG. 3, for reasons of clarity. The frame 8 here comprises the assigned spring element 18, integrally formed with the frame 8, for example, for each tilting pad 9.

The frame 8 with the tilting pads 9 here is accommodated in the sleeve 15 of the tilting-pad bearing 7 for supporting the shaft 17 received in the tilting-pad bearing 7. For adjusting the gap 14 between the inside of the sleeve 15 and the outside of the respective tilting pad 9 and for adjusting the gap 16 between the inside of the tilting pad 9 and the outside of the shaft 17, each of the tilting pads 9 comprises the assigned adjusting device 19 previously described by way of example with reference to FIGS. 1 and 2. The optional adjusting device 19 is indicated by a dashed line in FIG. 3 and comprises, for example, the pin portion having an external thread, shown and described with reference to FIGS. 1 and 2, and the associated nut having a corresponding internal thread arranged on the pin portion. Instead of three tilting pads 9, the tilting-pad bearing 7 according to the invention may also comprise just two tilting pads 9 or more than three tilting pads 9.

The scope for additional movement of the respective tilting pad 9 of the tilting-pad bearing 7 according to the invention in a radial direction afforded by the frame 8 and the optional spring elements 18, and any optional adjusting devices 19 provided, has the advantage, as previously described, that it is possible to adjust the gap geometry of the gap 14 between the outside of the tilting pad 9 and the inside of the sleeve 15, and the gap geometry of the gap 16 between the inside of the tilting pad 9 and the outside of the shaft 17 supported by the tilting-pad bearing 7. This furthermore has the advantage that the production tolerances can be corrected by a subsequent adjustment of the gap geometry, for example between the shaft 17 and the tilting pad 9, so that in particular the shaft 17 can be positioned in a radial direction. A further advantage lies in the flexible way it is possible to influence the gap geometry between the shaft 17 and the tilting-pad bearing 7 and its tilting pads 9 and hence the load-bearing behavior of the tilting-pad bearing 7.

The provision of the spring elements 18 makes it possible to provide rear-sprung tilting pads 9. These rear-sprung tilting pads 9 are advantageous primarily in fitting and aligning the shaft 17 to be supported by the tilting-pad bearing 7. In addition, such rear-sprung tilting pads 9 can also be used to enhance the stiffness and/or damping in operation.

The use of three tilting pads 9, for example, allows a shaft 17 to be supported by the tilting-pad bearing 7 according to the invention to be aligned centrally, and in particular exactly centrally. Moreover, due to the rear-springing of the tilting pads 9 the centering occurs almost entirely of its own accord.

The frame 8, described by way of example with reference to FIGS. 1, 2 and 3, allows the set of tilting pads 9 in the tilting-pad bearing 7 to be kept together and not mixed up with other tilting pads 9, for example.

Furthermore, the tilting pads 9 are already in an assembly position by the frame 8, so that handling and assembly of the tilting pad sub-assembly is considerably simplified.

In addition, the spring element 18 for the respective tilting pad 9 can be integrated into the frame 8, thereby likewise facilitating the handling and assembly of the tilting-pad bearing 7 to a considerable degree.

Although the present invention has been fully described above with reference to preferred exemplary embodiments, it is not limited to these but may be modified in a variety of ways. The exemplary embodiments shown in FIGS. 1, 2 and 3 and in particular individual features thereof may be combined with one another.

The invention claimed is:

1. A tilting-pad bearing (7) for a shaft (17), the tilting pad bearing (7) comprising:
   a sleeve (15) having an inner surface,
   a plurality of tilting pads (9) inside the sleeve, and
   a frame (8) which is disposed inside the sleeve (15) and in which the tilting pads (9) are received,
   wherein a plurality of spring elements (18) are formed on the frame (8), wherein each of the spring elements has a first spring member that runs in a circumferential and radial direction outwardly towards the sleeve (15), wherein each of the spring elements (18) engages the inner surface of the sleeve (15) to pretension the spring elements (18) and to allow the tilting pads to align the shaft (17), wherein the frame (8) comprises two annular portions (10, 11) which are connected to one another by a plurality of axially-extending and circumferentially-spaced connecting portions (12), and wherein each tilting pad (9) of the plurality of tilting pads (9) corresponds to and is mounted on a respective connecting portion (12) of the plurality of connecting portions (12).

2. The tilting-pad bearing as claimed in claim 1, wherein the frame (8) comprises at least one mounting portion (13)

for holding a respective tilting pad (9) of the plurality of tilting pads (9) in the frame (8) and for mounting the respective tilting pad (9) on the respective connecting portion (12), wherein the respective tilting pad (9) is held in the frame (8) by the at least one mounting portion (13) in such a way that the respective tilting pad (9) has some play in a radial direction.

3. The tilting-pad bearing as claimed in claim 2, wherein the respective tilting pad (9) comprises a recess (26), behind which a respective mounting portion (13) can grip or hook.

4. The tilting-pad bearing as claimed in claim 2, wherein the respective tilting pad (9) comprises a depression (28), in which at least a portion of a respective mounting portion (13) can be received and guided in such a way that the respective tilting pad (9) is either immovable or movable only within a predefined amount of play in an axial direction of the tilting-pad bearing (7).

5. The tilting-pad bearing as claimed in claim 2, wherein the respective tilting pad (9), comprises at least one slot (29) for one of the respective mounting portions (13), for inserting an outer end of one of the respective mounting portions (13) into the slot (29).

6. The tilting-pad bearing as claimed in claim 2, wherein the mounting portion (13) is formed on the respective connecting portion (12), and wherein the mounting portion (13) is integrally formed with the respective connecting portion (12), or is affixed to the respective connecting portion (12) as a separate component.

7. The tilting-pad bearing as claimed in claim 2, wherein one of the plurality of spring elements (18) has a second spring member, and wherein the first spring member is formed on a first circumferential side the respective connecting portion (12) and the second spring member is formed on an opposite second circumferential side of the respective connecting portion (12).

8. The tilting-pad bearing as claimed in claim 2, wherein the frame (8) is produced from sheet metal, plastic and/or a fiber composite, and at least one of the respective connecting portion (12), the respective mounting portion (13) and one of the plurality of spring elements (18) is at least one of stamped, cut, milled and shaped out of the frame (8).

9. The tilting-pad bearing as claimed in claim 2, wherein the respective tilting pad (9) comprises a step, behind which a respective mounting portion (13) can grip or hook.

10. The tilting-pad bearing as claimed in claim 2, wherein the respective tilting pad (9) comprises a grooved depression, in which at least a portion of a respective mounting portion (13) can be received and guided in such a way that the respective tilting pad (9) is either immovable or movable only within a predefined amount of play in an axial direction of the tilting-pad bearing (7).

11. The tilting-pad bearing as claimed in claim 2, wherein one of the plurality of spring elements (18) is formed on the respective connecting portion (12), and wherein the one of the plurality of spring elements (18) is integrally formed with the respective connecting portion (12), or is affixed to the respective connecting portion (12) as a separate component.

12. The tilting-pad bearing as claimed in claim 1, wherein the frame (8) comprises at least two mounting portions (13) for holding a respective tilting pad (9) of the plurality of tilting pads (9) and for mounting the respective tilting pad (9) on the respective connecting portion (12), wherein the at least two mounting portions (13) are provided on opposite sides of the respective tilting pad (9) and grip around the respective tilting pad (9) and wherein the respective tilting pad (9) is held in the frame (8) by at least the two mounting portions (13) in such a way that the respective tilting pad (9) has some play in a radial direction.

13. The tilting-pad bearing as claimed in claim 1, wherein the tilting-pad bearing (7) comprises an adjusting device (19) for adjusting an initial spring tension of a respective spring element (18) of the plurality of spring elements (18), wherein the adjusting device (19) for adjusting the initial spring tension is connected to a respective tilting pad (9) of the plurality of tilting pads (9) or to a respective spring element (18) of the plurality of spring elements (18).

14. The tilting-pad bearing as claimed in claim 1, wherein the frame (8) comprises at least one mounting portion (13) for holding a respective tilting pad (9) of the plurality of tilting pads (9) in the frame (8), wherein the respective tilting pad (9) is held in the frame (8) by at least the one mounting portion (13) in such a way that the respective tilting pad (9) has some play in a radial direction and also in a circumferential direction, in order to allow the tilting pad (9) to tilt in a circumferential direction.

15. The tilting-pad bearing as claimed in claim 1, wherein the frame (8) comprises at least two mounting portions (13) for holding a respective tilting pad (9) of the plurality of tilting pads (9), wherein at least the two mounting portions (13) are provided on opposite sides of the respective tilting pad (9) and grip around the respective tilting pad (9) and wherein the respective tilting pad (9) is held in the frame (8) by the at least two mounting portions (13) in such a way that the respective tilting pad (9) has some play in a radial direction and also in a circumferential direction, in order to allow the tilting pad (9) to tilt in a circumferential direction.

16. A tilting-pad bearing (7) comprising:
a sleeve (15),
a plurality of tilting pads (9) inside the sleeve, each of the tilting pads (9) having a radially inner surface extending between a first circumferential end and a second circumferential end, each of the tilting pads (9) having a recess (26) in the form of a step at an intersection of the radially inner surface and the first circumferential end, and each of the tilting pads (9) having a slot (29) adjacent the step, and
a frame (8) which is disposed inside the sleeve and in which the tilting pads (9) are received,
wherein the frame (8) includes a plurality of first mounting portions (13) each corresponding to a respective one of the tilting pads (9), wherein each of the first mounting portions (13) wraps around the first circumferential end of the respective one of the tilting pads and hooks on to the step of the respective one of the tilting pads (9), and wherein each of the first mounting portions (13) has an outer end that extends into the slot (29) of the respective one of the tilting pads (9).

17. The tilting-pad bearing of claim 16, wherein the respective tilting pads (9) are held in the frame (8) by the plurality of first mounting portions (13) in such a way that the respective tilting pads (9) have some play in a radial direction.

18. The tilting-pad bearing as claimed in claim 16, wherein the respective tilting pads (9) are held in the frame (8) by the plurality of first mounting portions (13) in such a way that the respective tilting pads (9) have some play in a radial direction and in a circumferential direction, in order to allow the tilting pad (9) to tilt in a circumferential direction.

19. The tilting-pad bearing as claimed in claim 16, wherein each of the respective tilting pads (9) comprises a grooved depression, in which at least a portion of each of the respective first mounting portions (13) can be received and guided in such a way that each of the respective tilting pads (9) is either immovable or movable only within a predefined amount of play in an axial direction of the tilting-pad bearing (7).

20. A tilting-pad bearing (7) for a shaft (17), the tilting pad bearing (7) comprising:
   a sleeve (15) having an inner surface,
   a plurality of tilting pads (9) inside the sleeve,
   a frame (8) which is disposed inside the sleeve (15) and in which the tilting pads (9) are received, and
   a plurality of spring elements (18) formed on the frame (8), each of the spring elements (18) having a set of two spring members each running in a circumferential and radial direction outwardly towards the sleeve (15),
   wherein each of the spring members engages the inner surface of the sleeve (15) to pretension the spring elements (18) and to allow the tilting pads to align the shaft (17), and wherein each of the sets of two spring members corresponds to a respective one of the tilting pads (9), and each of the sets of two spring members includes a first spring member that extends in a first circumferential direction away from the respective one of the tilting pads (9) and a second spring member that extends in an opposite second circumferential direction away from the respective one of the tilting pads (9).

21. The tilting-pad bearing as claimed in claim 20, wherein the frame (8) comprises two annular portions (10, 11) which are connected to one another by a plurality of axially-extending and circumferentially-spaced connecting portions (12), wherein each of the tilting pads (9) corresponds to and is mounted on a respective one of the connecting portions (12), and wherein each of the first spring members extends from a first circumferential side of the respective one of the connecting portions (12) and each of the second spring members extends from an opposite second circumferential side of the respective one of the connecting portions (12).

* * * * *